United States Patent [19]

Weterings et al.

[11] 4,387,083
[45] Jun. 7, 1983

[54] PROCESS FOR THE PREPARATION OF CALCIUM SULPHATE ANHYDRITE AND CALCIUM SULPHATE ANHYDRITE OBTAINED BY THIS PROCESS

[75] Inventors: Cornelis A. M. Weterings, Stein; Johannes A. Janssen, Schinveld, both of Netherlands

[73] Assignee: Stamicarbon, B.V., Geleen, Netherlands

[21] Appl. No.: 257,475

[22] Filed: Apr. 24, 1981

Related U.S. Application Data

[63] Continuation of Ser. No. 103,153, Dec. 13, 1979, abandoned.

[30] Foreign Application Priority Data

Dec. 13, 1978 [NL] Netherlands .......................... 7812109

[51] Int. Cl.$^3$ ........................ C01F 11/46; C01B 25/16
[52] U.S. Cl. ................................. 423/555; 423/170; 423/167; 423/320
[58] Field of Search ............... 423/170, 171, 172, 555, 423/167, 320

[56] References Cited

U.S. PATENT DOCUMENTS

| | | | |
|---|---|---|---|
| 2,006,342 | 7/1935 | Booge et al. | 423/172 |
| 2,021,910 | 11/1935 | Crundall | 423/555 |
| 2,151,339 | 3/1939 | Sullivan | 423/555 |
| 2,197,953 | 4/1940 | Sullivan | 423/555 |
| 2,999,007 | 9/1961 | McKenzie | 423/171 |
| 3,442,610 | 5/1969 | Mustian, Jr. et al. | 423/555 |
| 4,146,568 | 3/1979 | Lange, Jr. | 423/170 |

FOREIGN PATENT DOCUMENTS

| | | | |
|---|---|---|---|
| 561205 | 5/1944 | United Kingdom | 423/170 |
| 848617 | 9/1960 | United Kingdom | 423/170 |
| 1101771 | 1/1968 | United Kingdom | 423/170 |
| 1103206 | 2/1968 | United Kingdom | 423/170 |

OTHER PUBLICATIONS

Slack A. V., Phosphoric Acid, Marcel, Dekker Inc. NY NY 1968, vol. 1, Part II, pp. 545-548.
Masterson et al., Chemical Principles, N. B. Saunders Co., Philadelphia, Pa. 1969, pp. 362-364.

*Primary Examiner*—Gary P. Straub

[57] ABSTRACT

A process for preparing calcium sulphate anhydrite from calcium sulphate dihydrate so that the calcium sulphate anhydrite crystals will have a predetermined average particle size. The process is conducted by recrystallizing the calcium sulphate dihydrate at moderate temperatures in the presence of sulphuric acid having a concentration of 40-65% wt. calculated relative to the quantity of liquid phase in the recrystallization mixture. The particle size of the final product is controlled by varying the temperature and residence time of the recrystallization mixture in recrystallization zone and by varying the temperature in an inverse relationship to the acid concentration.

Calcium sulphate anhydrite crystals having an average particle size between about 0.5 and about 3 micron are produced by maintaining the temperature between about 40° C. and 90° C. and the residence time from about 5 minutes to less than about 30 minutes. Average particle sizes in the range of about 10 to about 20 micron are produced by maintaining the temperature in the range of about 20° C. and about 45° C. and the residence time between about 30 minutes and 3 hours.

Anhydrite seed crystals are not supplied in the reactor at the initiation of the recrystallization nor are added to the recrystallization mixture.

4 Claims, No Drawings

PROCESS FOR THE PREPARATION OF CALCIUM SULPHATE ANHYDRITE AND CALCIUM SULPHATE ANHYDRITE OBTAINED BY THIS PROCESS

This is a continuation, of application Ser. No. 103,153 filed Dec. 13, 1979, now abandoned.

The invention relates to a process for preparing calcium sulphate anhydrite from calcium sulphate dihydrate and concentrated sulphuric acid.

A process of this type is known from U.S. Pat. No. 2,531,977. In that process, calcium sulphate dihydrate obtained during the preparation of phosphoric acid is treated with sulphuric acid with an $H_2SO_4$ concentration of 15-33 wt. % at a temperature of from 60° C. to the boiling point of the sulphuric acid solution for a period of more than 30 minutes, more in particular 2-3 hours.

It is, further, stated that in order to obtain fine calcium sulphate anhydrite with a particle size of $2-3\mu$ it is necessary that conversion be performed in the presence of separately prepared, fine seeding material.

The present invention now provides a process by which calcium sulphate anhydrite can be obtained with any average particle size desired between about 0.5 and about $20\mu$ without it being necessary to add seeding material.

According to one portion of the present invention, recrystallization is performed using sulphuric acid with an $H_2SO_4$ concentration of about 40-65 wt. % while a temperature of between about 40° and about 90° C. and a residence time of about 5-30 minutes are applied for the preparation of calcium sulphate anhydrite with an average particle size of about $0.5-3\mu$. By changing to a temperature of between about 20° and about 45° C. and a residence time of about 30 minutes to about 3 hours as the recrystallization conditions calcium sulphate anhydrite can be prepared having an average particle size of $10-20\mu$.

The process according to the invention also has the advantage that both fine and coarse calcium sulphate anhydrite can be prepared in the same installation.

The recrystallization temperature can vary within the ranges indicated dependent on the acid concentration and vice-versa. Also, during the preparation of calcium sulphate anhydrite of a certain particle size, the higher the temperature is set within the appointed range, the lower the acid concentration should be, and vice-versa.

The $H_2SO_4$ concentration is here taken to mean the weight percentage of $H_2SO_4$ in the liquid phase of the recrystallization mixture. This is determined by the concentration of the acid supplied and by the ratio by weight of the acid supplied to the calcium sulphate dihydrate to be recrystallized. Preferably, highly concentrated sulphuric acid, e.g., 96 wt. % is fed into the recrystallization zone and the concentration of $H_2SO_4$ in the mixture set at the desired value by varying the ratio by weight of sulphuric acid supplied to calcium sulphate dihydrate to be recrystallized.

Further, it has been found that the average diameter of the calcium sulphate anhydrite formed can be increased by performing the recrystallization in the presence of multivalent metal ions, more in particular of di-, tri- and/or pentavalent metallic compounds. Compounds of iron, zinc, aluminum, chrome and/or vanadium are among the multivalent metallic compounds that can be used, preferably the salts of these metals or compounds that react in situ with sulphuric acid to form sulphate.

In principle, tetravalent metallic compounds can also be applied, but these not only affect the diameter of the particles but also cause the recrystallization of the calcium sulphate dihydrate to stop at the calcium sulphate hemihydrate stage.

The amount of metallic compound may vary within wide limits, for example from about 0.01-1 wt. %, calculated as metal relative to the total recrystallization mixture. There are no objections to a greater amount of metallic compound being used, but it yields no extra advantages. The amount of metallic compound preferably used is about 0.02-0.2 wt. %, calculated at metal relative to the total recrystallization mixture.

The metallic compound can be added in solid, liquid or dissolved form to the calcium sulphate dihydrate to be recrystallized or to the sulphuric acid or to the recrystallization mixture. Preferably, the metallic compound is added to the concentrated sulphuric acid. The calcium sulphate anhydrite formed during recrystallization can be separated from the recrystallization liquor in various ways, for example by centrifuging or filtering. The product formed is comprised almost completely of calcium sulphate anhydrite, and has a block-like structure with a length-breadth-thickness ratio of about 10:10:2. By using multivalent metal ions in recrystallization, particles are obtained with a length-breadth:thickness ratio of about 10:10:(8-10). The fine product with an average particle diameter of about $0.5-3\mu$ formed according to the invention has a bulk density of about 1000 to about 1500 g/l and is extremely suitable for use in the production of building elements. The coarse $10-20\mu$ product formed has a bulk density of about 700 to about 1000 g/l, and is very suitable for use as a coating or a filler in the paper industry.

The remaining, dilute recrystallization acid can be used for various purposes, for example for preparing ammonium sulphate, for preparing ammonium sulphate nitrate, for digesting rock phosphate, etc.

Natral gypsum or a dihydrate formed as a by-product in chemical processes can be used as calcium sulphate dihydrate. Preferably, calcium sulphate dihydrate produced as a by-product of phosphoric acid manufacture based on rock phosphate and sulphuric acid is used. This calcium sulphate dihydrate, also known as phosphogypsum, still contains various impurities, for example metals, fluorine compounds, phosphates, which after dehydration in a known way render it unsuitable for industrial application, for example, in the building or paper industry. In the recrystallization of such a "phosphogypsum" to calcium sulphate anhydrite according to the present invention, these impurities are transferred to the recrystallizaton acid and very pure calcium sulphate anhydrite is obtained.

The resulting recrystallization acid is suitable for digesting rock phosphate. Fresh technical sulphuric acid (96%) can in that case be used first for recrystallization. By absorption of crystal water from the phosphogypsum, it is then diluted to the strength required for digestion (70%), so that a separate dilution step is superfluous.

The invention will be further elucidated in the following examples.

EXAMPLE 1

Calcium sulphate dihydrate obtained as a by-product of wet-process phosphoric acid manufacture was supplied to a 0.3-liter, glass reaction vessel provided with a stirrer. Concentrated 96% sulphuric acid was then supplied to an amount such that the $H_2SO_4$ concentration in the liquid phase of the recrystallization mixture was 60 wt. %.

The temperature in the reaction vessel was kept at 60° C. The mixture was stirred in the reaction vessel for 20 minutes.

The resulting paste was then filtered. The filter cake was rinsed out with cold water and immediately dried at 100° C.

It was shown by X-ray diffraction that the solid product consisted of 100% calcium sulphate anhydrite. The product had a block-like structure with an average length and breadth of 2.5$\mu$ and an average thickness of 0.5$\mu$. The bulk density was about 1100 g/liter.

EXAMPLES 2-6

In the same way as in Example 1, calcium sulphate dihydrate was recrystallized with sulphuric acid at varying temperature, acid concentration and residence time values.

The results are summarized in Table 1 as follows:

TABLE 1

| Example | $H_2SO_4$ Conc. in wt. % rel. to Mixture | Temp. in °C. | Residence Time | Calcium Sulphate Anhydrite Product | | |
|---|---|---|---|---|---|---|
| | | | | Length in $\mu$ | Thickness in $\mu$ | Bulk Density in g/l |
| 1 | 60 | 60 | 20 min. | 2.5 | 0.5 | 1100 |
| 2 | 45 | 40 | 2 hours | 15 | 3-4 | 800 |
| 3 | 55 | 70 | 20 min. | 2.5 | 0.5 | 1100 |
| 4 | 65 | 60 | 20 min. | 1 | 0.2 | 1200 |
| 5 | 60 | 70 | 10 min. | 0.5 | 0.1 | 1450 |
| 6 | 55 | 25 | 2.5 hours | 15-17 | 4 | 750-850 |

EXAMPLE 7

In the same way as in Example 1, calcium sulphate dihydrate was recrystallized with sulphuric acid to which zinc sulphate had been added to a concentration of 0.1 wt. % zinc, calculated relative to the total recrystallization mixture. The $H_2SO_4$ concentration in the recrystallization mixture was 50 wt. %; the temperature was kept at 40° C.

After 1 hour the paste was filtered off and the filter cake washed with cold water and dried at 100° C.

The product consisted of block-shaped particles with an average length and breadth of about 12$\infty$ and an average thickness of 10-12$\mu$.

EXAMPLES 8-9

In the same way as in Example 7, Calcium sulphate dihydrate was recrystallized with sulphuric acid at varying temperature, sulphuric acid concentration, residence time and metal supplement values. The results are summarized in Table 2 as follows:

TABLE 2

| Example | $H_2SO_4$ Conc. in wt. % rel. to Mixture | Temp. in °C. | Residence Time | Metal Supplement in wt. % rel. to Mixture | Product | |
|---|---|---|---|---|---|---|
| | | | | | Length in $\mu$ | Thickness in $\mu$ |
| 7 | 50 | 40 | 1 hour | 0.1 $ZnSO_4$ | 12 | 10-12 |
| 8 | 55 | 70 | 20 min. | 0.05 $Cr(NO_3)_3$ | 3 | 2.5-3 |
| 9 | 55 | 60 | 25 min. | 0.05 $V_2O_5$ | 3 | 3 |

EXAMPLE 10

By the same procedure as in Example 1, impure gypsum obtained from wet-process phosphoric acid manufacture was recrystallized with sulphuric acid at 60° C. for a residence time of 20 minutes. The $H_2SO_4$ concentration in the mixture was set at 60 wt. %. The product had the same dimensions and bulk density as that of Exampe 1.

Both the crude gypsum and the resulting anhydrite were analyzed for phosphate, fluorine and several metals.

The result is given in Table 3 as follows:

TABLE 3

| | Crude Gypsum | Calcium Sulphate Anhydrite |
|---|---|---|
| $P_2O_5$ | 0.34% | <0.01% |
| Fluorine | 0.85% | 0.05% |
| Aluminum | 700 ppm | 140 ppm |
| Lead | >10 ppm | <10 ppm |
| Potassium | 100 ppm | 20 ppm |

The above table shows that the majority of the impurities are transferred to the liquid phase of the recrystallization mixture in recrystallization.

While the invention has been described in connection with what is presently considered to be the most practical and preferred embodiments, it is to be understood that the invention is not to be limited to the disclosed embodiments but on the contrary, is intended to cover various modifications and equivalent arrangements included with the spirit and scope of the appended claims, which scope is to be accorded the broadest interpretation.

What is claimed is:

1. Process for preparing calcium sulphate anhydrite crystals wherein calcium sulphate dihydrate is recrystallized at an elevating temperature in the presence of concentrated sulphuric acid comprising maintaining in the recrystallization zone a sulphuric acid concentration of 40-65% wt. calculated relative to the quantity of liquid phase in the recrystallization mixture and controlling the average particle size of the calcium sulphate anhydrite crystals by varying the temperature and residence time of the recrystallization mixture in the recrystallization zone so that the temperature is maintained between about 40° C. and about 90° C., and the residence time is from about 5 minutes to less than about 30 minutes, thereby producing calcium sulphate anhydrite crystals having an average particle size between about 0.5μ and about 3μ, and wherein calcium sulphate anhydrite crystals of a given average particule size may be produced by varying the temperature in an inverse relationship to the acid concentration and wherein no anhydrite seed crystals are present in the reactor at the initiation of the recrystallization and wherein no anhydrite seed crystals are added to the recrystallization mixture.

2. Process for preparing calcium sulphate anhydrite crystals wherein calcium sulphate dihydrate is recrystallized at an elevated temperature in the presence of concentrated sulphuric acid comprising maintaining in the recrystallization zone a sulphuric acid concentration of 40–65% wt. calculated relative to the quantity of liquid phase in the recrystallization mixture and controlling the average particle size of the calcium sulphate anhydrite crystals by varying the temperature residence time of the recrystallization mixture in the recrystallization zone so that the temperature is maintained between about 20° C. and about 45° C., and the residence time is between about 30 minutes and about 3 hours, thereby producing calcium sulphate anhydrite crystals having an average particle size between about 10μ and about 20μ, and wherein calcium sulphate anhydrite crystals of a given average particle size may be produced by varying the temperature in an inverse relationship to the acid concentration and wherein no anhydrite seed crystals are present in the reactor at the initiation of the recrystallization and wherein no anhydrite seed crystals are added to the recrystallization mixture.

3. Process according to claim 2 further including the step of obtaining calcium sulphate dihydrate in the preparation of phosphoric acid resulting from the digesting of phosphate ore with sulphuric acid.

4. Process according to claim 2 further including the step of separating calcium sulphate anhydrite from the mixture obtained in recrystallization and using the remaining dilute sulphuric acid for digesting phosphate ore.

* * * * *